April 28, 1942.  A. L. FREEDLANDER  2,281,148
WRAPPED BELT
Filed Aug. 25, 1939  3 Sheets-Sheet 1
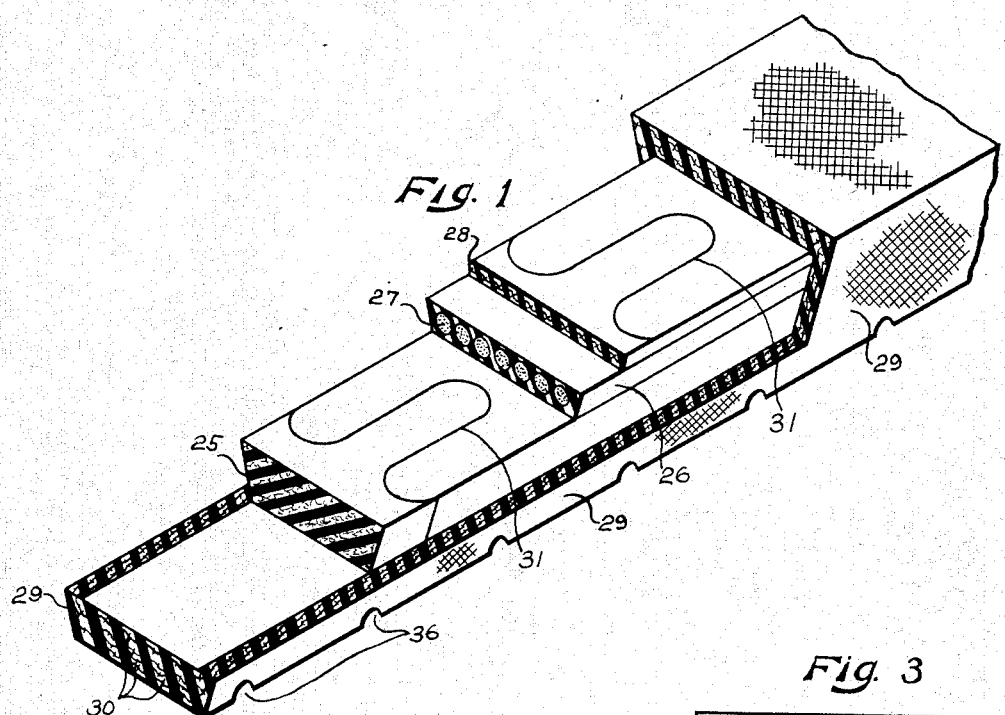
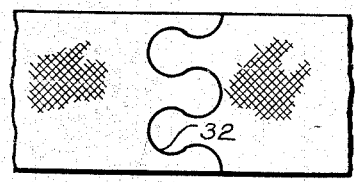
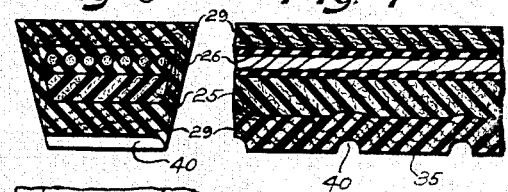
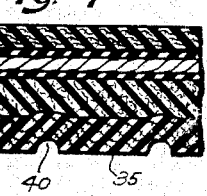
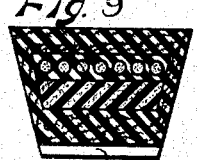
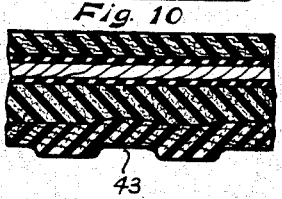
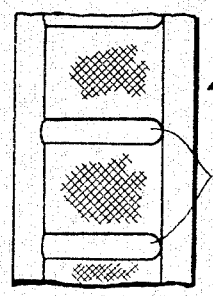
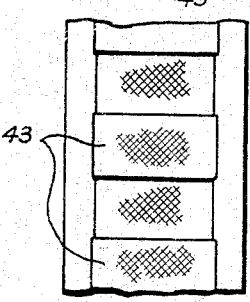
INVENTOR
ABRAHAM L. FREEDLANDER
BY
ATTORNEYS April 28, 1942.　　　　A. L. FREEDLANDER　　　　2,281,148
　　　　　　　　　　　　　WRAPPED BELT
　　　　　　　　　Filed Aug. 25, 1939　　　　3 Sheets-Sheet 2
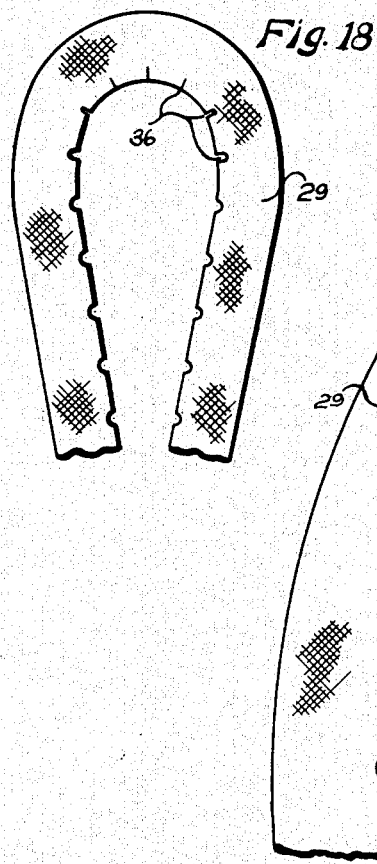
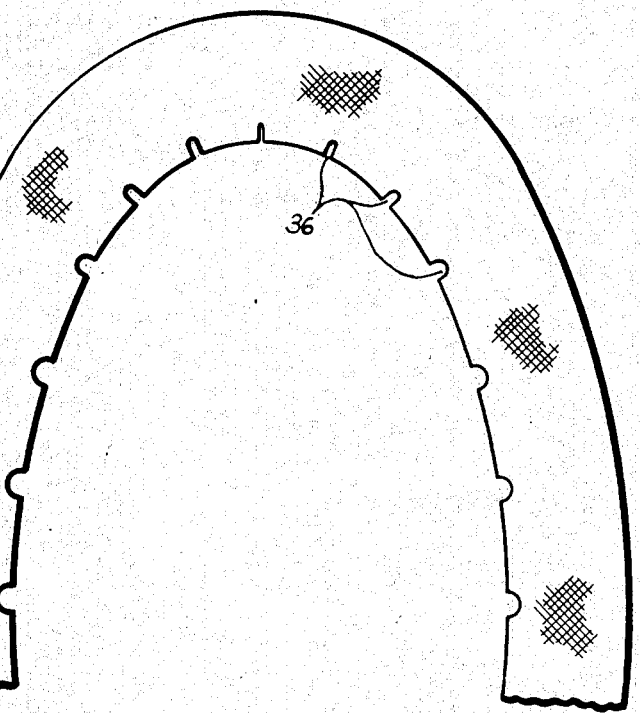
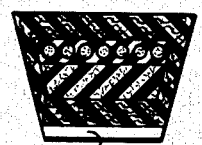
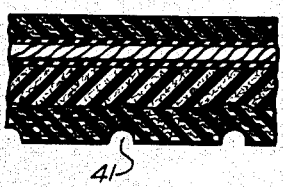
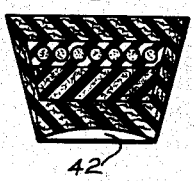
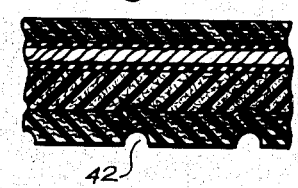
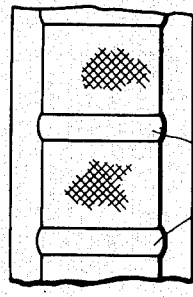
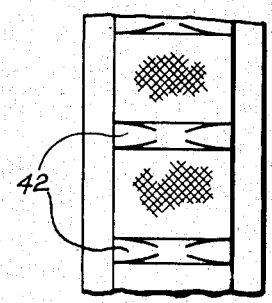
INVENTOR
ABRAHAM L. FREEDLANDER
BY
ATTORNEYS April 28, 1942.　　　A. L. FREEDLANDER　　　2,281,148
WRAPPED BELT
Filed Aug. 25, 1939　　　3 Sheets-Sheet 3
Fig. 19　　Fig. 20　　Fig. 21
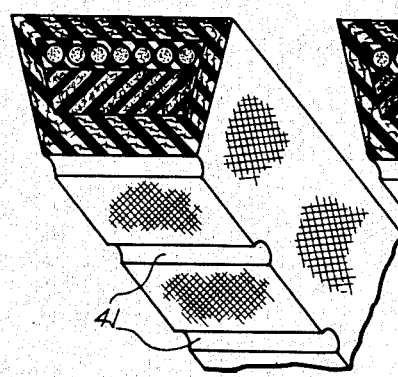 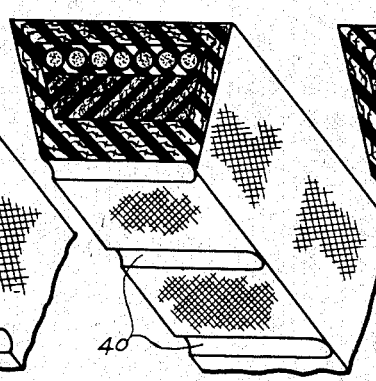 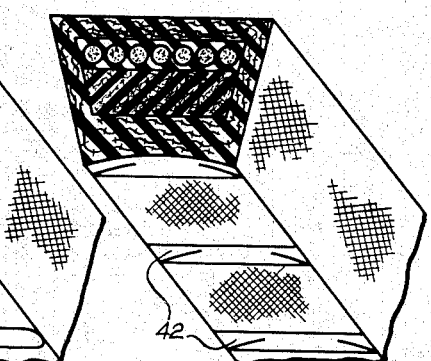
Fig. 22
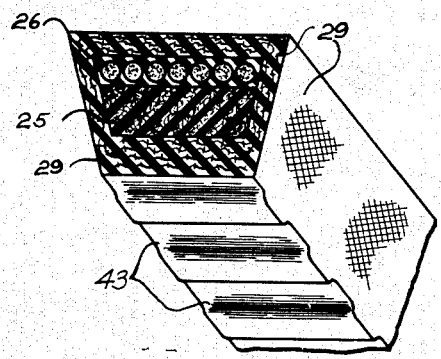
Fig. 23
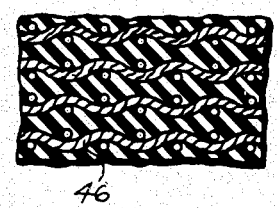
Fig. 24
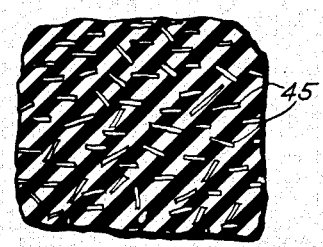
INVENTOR
ABRAHAM L. FREEDLANDER
BY
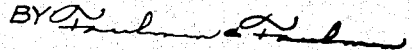
ATTORNEYS Patented Apr. 28, 1942

2,281,148

UNITED STATES PATENT OFFICE 2,281,148

WRAPPED BELT

Abraham L. Freedlander, Dayton, Ohio, assignor to The Dayton Rubber Mfg. Company, Dayton, Ohio, a corporation of Ohio Application August 25, 1939, Serial No. 291,919

3 Claims. (Cl. 74—233)

This invention relates to improvements in power transmitting belts and more particularly wrapped belts.

It is an object of this invention to provide a V-type wrapped belt comprising grooves on the underside so as to produce a belt having improved flexibility and a cooler operating belt.

Another object is to provide an improved cog belt which is very durable and will develop less heat in operation than the belts of this type heretofore made.

Another object is to devise a V-type groove belt which will have longer life in service and will constantly transmit driving power in a smooth, silent and efficient manner at a low cost.

Another object is to devise a V-type cog belt wherein grooves of improved construction are formed on the inner side to provide a highly flexible, cool running belt.

Another object is to provide a belt of this character wherein the spaced grooves formed on the underside of the belt are adapted to close as the belt passes around a pulley of relatively small radius of curvature so as to take up the compressive force acting on the inner side of the belt.

Another object is to provide a wrapped V-belt which is of balanced crosswise rigidity but is readily flexible about a transverse axis having no tendency to twist or become distorted in operation.

Another object is to provide a wrapped cog belt which is adapted to be bent over relatively small pulleys without developing internal strain in the body of the belt.

Referring to the drawings:

Figure 1 is a perspective sectional view on an enlarged scale of my improved belt;

Figures 2, 3 and 4 illustrate different modifications of forming the picot splices for the layers in constructing the belt;

Figure 5 is a detail plan view of the belt provided with grooves on the inner side curved in cross section;

Figures 6 and 7 are detail transverse and longitudinal sectional views respectively of the belt construction shown in Figure 5;

Figure 8 is a fragmentary detail plan view of a belt having rectangular shaped grooves formed on the underside;

Figures 9 and 10 are detail transverse and longitudinal sectional views of the belt construction illustrated in Figure 8;

Figure 11 is a fragmentary detail plan view of a belt wherein the grooves are of semi-circular shaped cross section and extending transversely of the inner surfaces of the belt;

Figures 12 and 13 are detail transverse and longitudinal sectional views respectively of the belt construction shown in Figure 11;

Figure 14 is a fragmentary detail view of another modification wherein the grooves or cogs are of arcuate shape along their longitudinal axis;

Figures 15 and 16 are detail transverse and longitudinal sectional views respectively of the belt construction illustrated in Figure 14;

Figure 17 is a detail view of the belt partly broken away showing the progressive closing of the grooves around the curved portions of the belt when it is bent;

Figure 18 is a similar view showing the closing of the grooves at the bend, when the belt is bent through a small radius of curvature.

Figure 19 is a perspective view of a section of the belt comprising grooves of the shape illustrated in Figure 11;

Figure 20 is a perspective view of a section of the belt having grooves on the underside, of the shape shown in Figure 5;

Figure 21 is a similar perspective view of a section of belt having grooves as illustrated in Figure 14;

Figure 22 is a similar perspective view of a section of the belt having grooves as shown in Figure 8;

Figure 23 is a fragmentary enlarged detail view of the fiber impregnated rubber composition employed in constructing the wrapped belt;

Figure 24 is a similar fragmentary enlarged detail view of a fiber reinforced rubber composition, trade named "Stiflex," used in making the belt.

Referring to the drawings in detail, there is illustrated in Figure 1 a belt which comprises the compression section 25 formed of "Stiflex" or equivalent rubber composition reinforced with fine substantially parallel textile fibers which are disposed transversely therein. Upon this layer is superimposed the strength band or neutral axis section 26. This section of the belt is provided with tightly twisted cords 27 embedded in rubber making the belt substantially inextensible. Over this section is disposed a rubberized fabric layer 28 to provide longitudinal extensibility with comparatively little extensibility laterally. The fabric in this instance may be of bias-laid square woven textile fabric.

A wrapper or cover layer 29 comprising layers of rubberized fabric is disposed around the body of the belt. This wrapper member preferably comprises several fabric plies 30 which are bias wound around the belt body and cured thereto forming a unitary belt structure. The abutting ends of the layers 25 and 28 are interlocked by picot splices 31 as illustrated in Figure 1. This manner of splicing the different layers together overcomes any tendency of the layers forming the belt to pull apart or draw away from each other at their ends which would lengthen the belt. Other picot-type splicing of the ends of the different layers may be used, such as that illustrated in Figures 2, 3 and 4 at 32, 33 and 34, respectively.

The inner surface of the belt wrapper 29 is provided with spaced grooves, generally designated 36, which are designed to increase the flexibility of the belt, permitting it to pass over relatively small diameter pulleys and in addition function to ventilate the inner surface of the belt so as to provide a cool running belt. These groove portions may be of different size and cross sectional shape, as illustrated in Figures 19 to 22 inclusive. They substantially confine outward distortion or bulging to the wrapper, in passing around curves. By preventing such bulging or distortion from being communicated to the compression section 25, to any substantial degree, (if at all), the life of the belt is substantially lengthened, it being understood that repeated distortions of the belt body in time cause disintegration and rupture of the rubber particles in the belt layers, finally destroying or materially reducing the usefulness of the belt.

As shown in all of the sectional views of the drawings, with the exception of Figs. 23 and 24, and the perspective sectional view, Fig. 1, my belt is a two-part belt comprising a compression section 25, and a neutral axis section 26, both of said sections being enclosed in the wrapper 29. Fig. 1, however, is a three-part belt, comprising tension, neutral axis, and compression sections, enclosed in the same wrapper 29, as my two-part belt.

As shown in Figures 5, 6, and 20, the grooves 40 are open only at one end. In Figures 11, 12, 13 and 19, the grooves 41 are of semi-circular cross section and extend all the way across the underside of the belt. This shape of groove is preferable but it will be understood that any desired shape may be used. In some instances a groove of arcuate shape in longitudinal section may be employed, as illustrated by the grooves 42 in Figures 14, 15, 16 and 21. Similarly rectangular shaped spaced grooves 43 may be formed on the underside of the belt as indicated in Figures 8, 9, 10 and 22.

The material forming the compression section 25 is made of rubber or equivalent resilient material which is reinforced with fine, parallel textile fibers 45 disposed substantially transversely of the section, as shown in Figure 24. This particular reinforced rubber composition is generally known in the art as "Stiflex." The transverse reinforcement in the material greatly enhances the lateral incompressibility thereof while offering substantially no resistance to flexing of the section about its transverse axis.

Rubberized fabric making up the layer 28 in Fig. 1 and cover section 29 is preferably made of bias-laid square woven rubberized textile fabric 46, as illustrated in Figure 23. The term "bias-laid" indicates that the fiber threads are diagonally disposed with respect to both the longitudinal and transverse axis of the material and the belt. This construction substantially increases the tensile strength of the belt.

Preferably a four-ply rubberized fabric covering is employed as shown in Figure 23 and the inner side comprises spaced molded grooves. By employing grooves of different depth, shape and spacing the bendability or flexibility of the belt may be varied as desired. Further, by positioning the neutral axis portion, which comprises the inextensible cords 27, near the outer part of the belt a substantially noiseless operating belt is provided.

Belts of this construction are preferably formed by laying one ply on another around a drum or mold to build up the laminated belt body; thereafter the V-shaped belt is cut from the drum and the wrapper cover is folded around the laminated layers and the whole vulcanized to a unitary structure. In the case where the belt is built up in a ring mold the walls of the mold will be inclined at an angle to provide a V-shaped belt after vulcanizing. Further the grooves which are formed on the inner side of the belt are preferably molded during the final vulcanization treatment.

It will be understood that it is desired to be comprehended within this invention such modifications as may be necessary to adapt it to varying conditions and uses.

Having thus fully described my invention, what I claim as new and desire to secure by Letters Patent is:

1. In a belt, a plurality of sections comprising the body of the belt, one of said sections being a compression section of rubber composition reinforced with fine textile fibres which are disposed substantially parallel and transversely of the longitudinal axis of said belt, a neutral axis section including a plurality of parallel laid cords extending longitudinally of said belt and a wrapper completely encircling said belt and provided with spaced grooves extending at right angles to the side walls of the belt and molded on the inner side thereof, the depth of said grooves being less than the depth of the underside thickness of the wrapper.

2. A wrapped belt comprising a tension section formed of superimposed layers of rubberized fabric made up of bias-laid square woven textile fabric, a neutral axis section comprising a plurality of parallel laid cords extending longitudinally of said belt, a compression section comprising rubber composition reinforced with fine textile fibers which are disposed substantially parallel and transversely of the longitudinal axis of said belt, a wrapper enclosing said tension, neutral axis and compression sections of the belt formed of a plurality of bias-laid square woven rubberized fabric layers, said wrapper having spaced grooves along the inner side surface which extend substantially at right angles to the side walls of the belt, said grooves being of less depth than the thickness of said wrapper.

3. A wrapped belt comprising a tension section formed of superimposed layers of rubberized fabric made up of bias-laid square woven textile fabric, a neutral axis portion which comprises inextensible parallel laid cords forming a layer extending longitudinally of said belt and which is positioned near the outer part of the belt, a compression section comprising rubber composition reinforced with fine textile fibers, and an outer cover portion enclosing said body layer portions made up of a plurality of rubberized fabric plies, the whole being vulcanized together to form an integral belt, said cover portion comprising spaced shallow grooves along the inner surface of said belt which extend substantially at right angles to the side walls of said belt, said grooves being of less depth than the thickness of the cover and molded in the cover portion during the final vulcanization of the belt.

ABRAHAM L. FREEDLANDER.